(12) United States Patent
Park et al.

(10) Patent No.: US 12,189,326 B2
(45) Date of Patent: Jan. 7, 2025

(54) STRUCTURE TO DETECT FULL STATE OF TWO RESERVOIRS IN WASTE TONER CONTAINER

(71) Applicant: Hewlett-Packard Development Company, L.P., Spring, TX (US)

(72) Inventors: Jinsam Park, Seongnam Si (KR); Jinhong Kim, Seongnam Si (KR); Seongwoong Yang, Seongnam Si (KR); Youngchae Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/565,834

(22) PCT Filed: Oct. 12, 2021

(86) PCT No.: PCT/US2021/071818
§ 371 (c)(1),
(2) Date: Nov. 30, 2023

(87) PCT Pub. No.: WO2023/277955
PCT Pub. Date: Jan. 5, 2023

(65) Prior Publication Data
US 2024/0264561 A1 Aug. 8, 2024

(30) Foreign Application Priority Data
Jun. 30, 2021 (KR) .................. 10-2021-0085960

(51) Int. Cl.
G03G 21/12 (2006.01)
G01F 23/292 (2006.01)
(Continued)

(52) U.S. Cl.
CPC ......... *G03G 21/12* (2013.01); *G01F 23/2921* (2013.01); *G03G 15/0844* (2013.01);
(Continued)

(58) Field of Classification Search
CPC ........... G03G 15/0844; G03G 15/0862; G03G 15/0865; G03G 21/105; G03G 21/12; G03G 2215/0891; G01F 23/2921
See application file for complete search history.

(56) References Cited

U.S. PATENT DOCUMENTS 6,078,761 A 6/2000 De Waal
8,224,196 B2 7/2012 Oh
(Continued)

FOREIGN PATENT DOCUMENTS

| JP | 2002-328522 A | 11/2002 |
| JP | 2010-072310 A | 4/2010 |
| JP | 2014-115326 A | 6/2014 |

*Primary Examiner* — Sophia S Chen
(74) *Attorney, Agent, or Firm* — Foley & Lardner LLP

(57) ABSTRACT

Provided is a waste toner container including a housing having a first reservoir and a second reservoir, a light sensor including a light emitting portion and a light receiving portion, and a light guide member to connect the light emitting portion with the light receiving portion. The light guide member includes a first detection portion and a second detection portion each including a pair of optical surfaces that are apart from each other, and the first and second detection portions are provided in the first and second reservoirs, respectively.

15 Claims, 12 Drawing Sheets

(51) Int. Cl.
*G03G 15/08* (2006.01)
*G03G 21/10* (2006.01)

(52) U.S. Cl.
CPC ....... *G03G 15/0862* (2013.01); *G03G 21/105* (2013.01); *G03G 2215/0891* (2013.01)

(56) References Cited

U.S. PATENT DOCUMENTS

| | | |
|---|---|---|
| 2002/0181962 A1 | 12/2002 | Henricus et al. |
| 2004/0109039 A1 | 6/2004 | Kojima et al. |
| 2008/0181627 A1* | 7/2008 | Bae .................... G03G 15/0862 399/27 |
| 2009/0220257 A1* | 9/2009 | Tsusaka ................ G03G 21/12 399/35 |
| 2013/0183050 A1* | 7/2013 | Kwon .................... G03G 21/12 399/35 |
| 2013/0236197 A1* | 9/2013 | Yoshida ............. G03G 15/0868 399/109 |
| 2016/0124378 A1* | 5/2016 | Mizutani ................ G03G 21/12 399/360 |
| 2016/0282800 A1 | 9/2016 | Nakata |
| 2018/0011042 A1 | 1/2018 | Sells et al. |

\* cited by examiner

STRUCTURE TO DETECT FULL STATE OF TWO RESERVOIRS IN WASTE TONER CONTAINER

CROSS-REFERENCE TO RELATED APPLICATIONS

This application is a U.S. National Stage Patent Application under 35 U.S.C. § 371 of PCT/US2021/071818, filed Oct. 12, 2021, which claims priority to Korean Patent Application No. 10-2021-0085960, filed Jun. 30, 2021, which are hereby incorporated by reference in their entireties.

BACKGROUND

An electrophotographic image forming apparatus may form a visible toner image on a photoconductor by supplying a toner accommodated in a developing device to an electrostatic latent image formed on the photoconductor, transfer the toner image to a printing medium, and fuse the transferred toner image on the printing medium. A waste toner generated in an image forming process may be accommodated in a waste toner container. In the waste toner container, a sensor to detect a full state of the waste toner container may be arranged. When the waste toner container is full of the waste toner, the waste toner container may be replaced by a new container.

DETAILED DESCRIPTION

Figure 1:
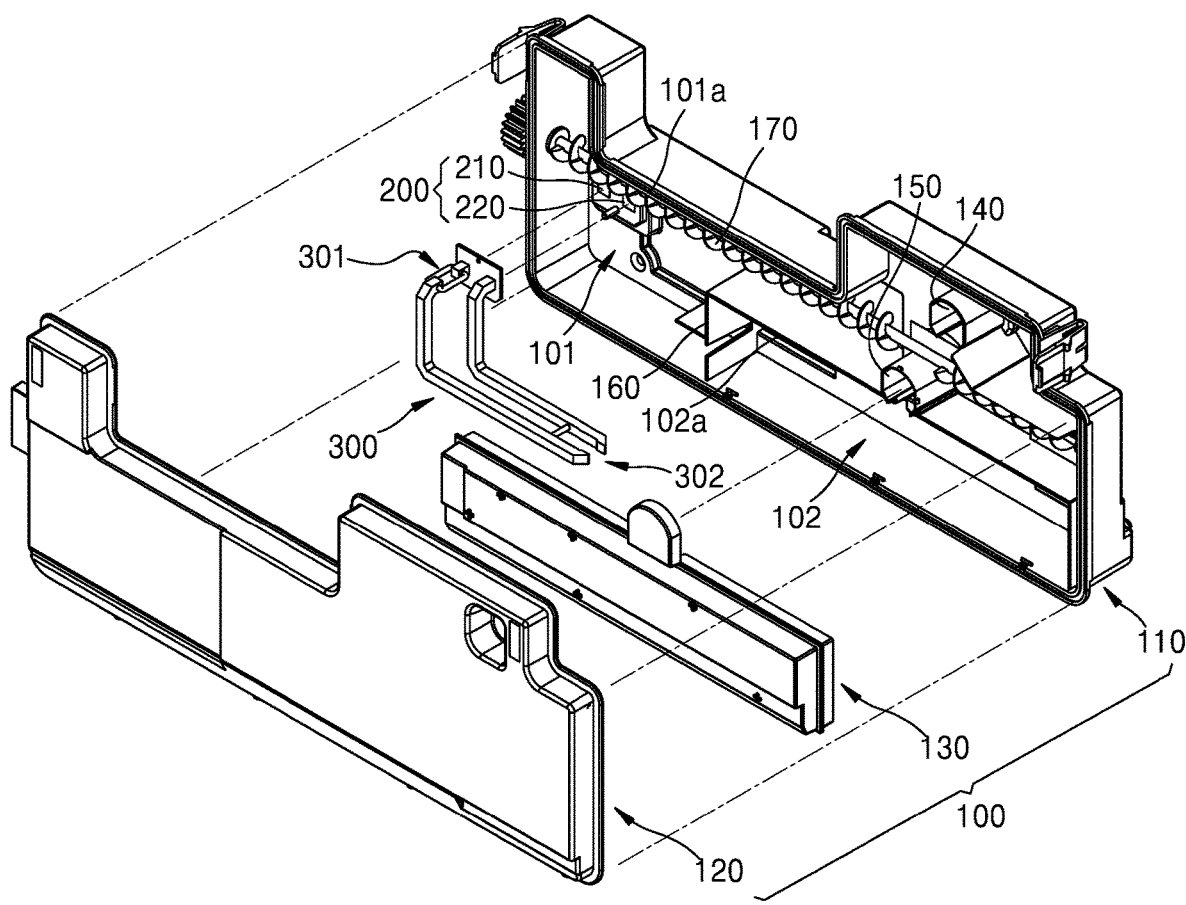
FIG. 1 is an exploded perspective view of an example of a waste toner container.

A waste toner may be generated during an image forming process using an electrophotographic method. For example, after a toner image formed on a photosensitive drum is transferred to a printing medium, a toner may remain on the photosensitive drum. Before forming a next toner image, the toner remaining on the photosensitive drum may be removed. Hereinafter, the removed toner is referred to as a "waste toner." The waste toner may be accommodated in a waste toner container. As a developing method, an automatic developer replenishment (ADR) method may be implemented. According to the ADR method, a developer, for example, a toner and a carrier, may be supplied to a developing device, and a surplus developer may be discharged from the developing device. Hereinafter, the discharged surplus developer is referred to as a "waste developer." The waste developer may be accommodated in the waste toner container. The waste toner and the waste developer may be separately accommodated in the waste toner container. For example, the waste toner and the waste developer may be accommodated in a first reservoir and a second reservoir, respectively. A sensing structure to detect a full state of the first reservoir and the second reservoir may be implemented in the waste toner container.

The waste toner container according to the present example may include a housing having the first reservoir and the second reservoir, and a light guide member including a first detection portion and a second detection portion each including a pair of optical surfaces that are apart from each other, where the first and second detection portions are provided in the first reservoir and the second reservoir, respectively. The light guide member may connect a light emitting portion to a light receiving portion of a light sensor and may form a light path. For example, the waste toner removed from the photosensitive drum may be accommodated in the first reservoir, and the waste developer discharged from the developing device may be accommodated in the second reservoir. When the first reservoir is in a full state, the waste toner may accumulate around the photosensitive drum, and thus, a printed image may have background contamination. When the second reservoir is in a full state, the waste developer may not be able to be discharged from the developing device, and thus, developer pressure in the developing device may be increased so that a low image density of a printed image and toner leakage from the developing device, etc., may occur.

In the waste toner container according to the present example, a light path from the light emitting portion to the light receiving portion may be formed by the light guide member, and in the middle of the light path, the first detection portion and the second detection portion may be formed in the first reservoir and the second reservoir, respectively. When the waste toner or the waste developer accumulates around the first detection portion and/or the second detection portion, the amount of light passing through the first detection portion and/or the second detection portion may be reduced, or light may not pass through the first detection portion and/or the second detection portion. The light receiving portion may generate an electrical signal corresponding to the amount of light passing through the first and second detection portions. The electrical signal may be converted into a digital signal by, for example, an amplifier, a filter, and an analog-to-digital (AD) converter. A controller of an image forming apparatus may determine, based on the digital signal, whether any one of the first reservoir and the second reservoir is in a full state. According to this configuration, a single light sensor may be implemented and a full state of either of the first reservoir and the second reservoir may be detected.

For example, the light guide member may include: a facing portion having a first surface facing the light sensor and a second surface that is opposite to the first surface; a first light guide facing any one of the light emitting portion and the light receiving portion and extending from the second surface of the facing portion to the first reservoir; a second light guide to form, in the first reservoir, the first detection portion between the second light guide and the first light guide and extending from the first reservoir to the second reservoir; and a third light guide facing the other of the light emitting portion and the light receiving portion and extending from the second surface to the second reservoir to form the second detection portion between the third light guide and the second light guide. The first light guide and the third light guide may protrude from the first surface of the facing portion and may face the light sensor. The light guide member may include a first connection portion that provides a detour light path around the first detection portion to connect the first light guide with the second light guide, so that the facing portion, the first light guide, the second light guide, and the third light guide may be integrally formed with one another. The light guide member may include a second connection portion that provides a detour light path away from the second detection portion to connect the second light guide with the third light guide. A cross-sectional area of each of the first connection portion and the second connection portion may be less than a cross-sectional area of each of the first light guide, the second light guide, and the third light guide. The second reservoir may be located in the first reservoir. Hereinafter, examples of the waste toner container are described in detail by referring to the accompanying drawings. Also, in this specification and the drawings, components having substantially the same functional configurations are referred to by the same reference numerals, so as not to give repeated descriptions.

Figure 2:
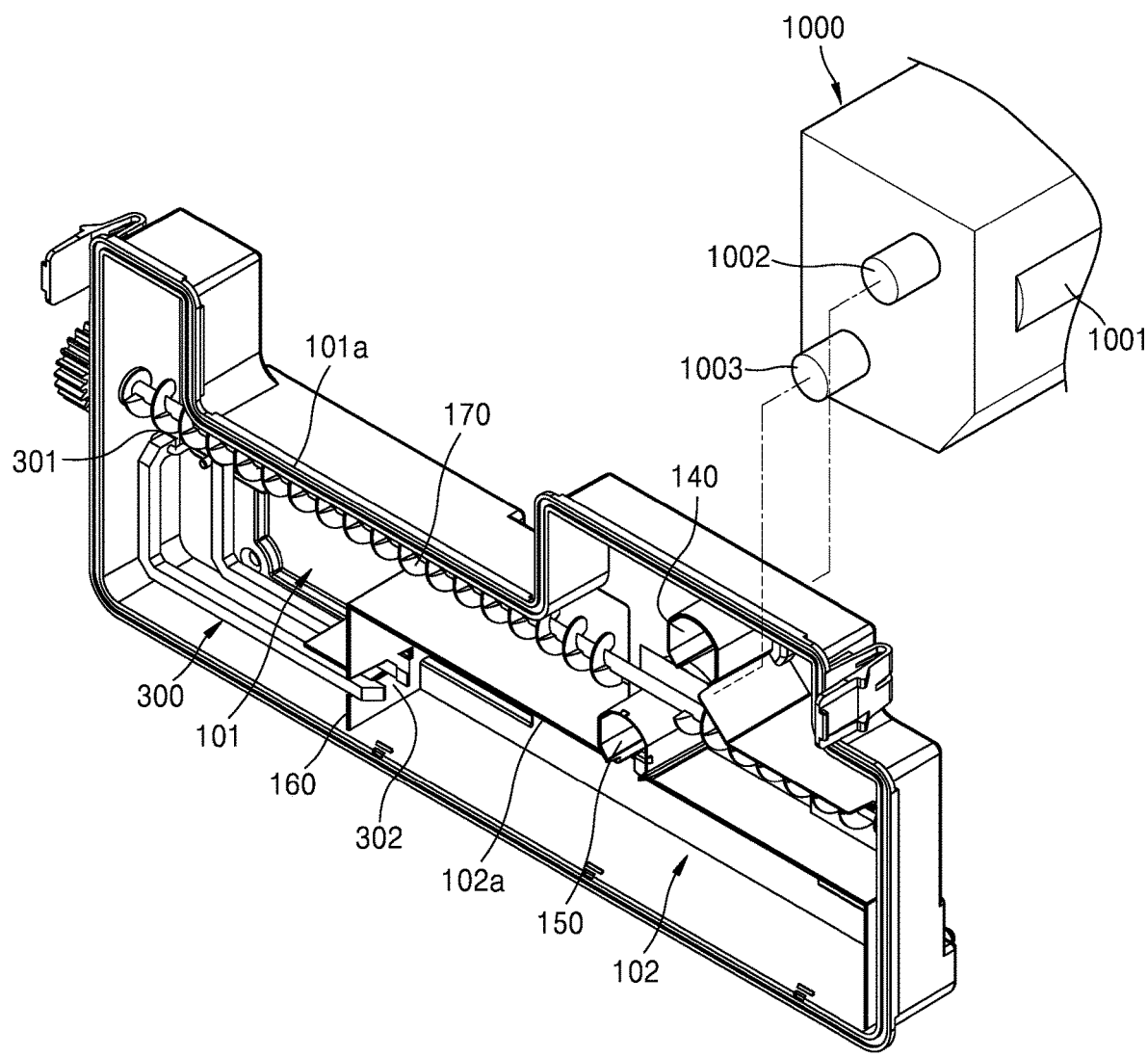
FIG. 2 is an interior perspective view of the example of the waste toner container illustrated in FIG. 1.

FIG. 1 is an exploded perspective view of an example of a waste toner container. FIG. 2 is an interior perspective view of the example of the waste toner container illustrated in FIG. 1. In FIG. 2, a second housing 120 and an inner cover 130 are omitted. Referring to FIGS. 1 and 2, the example of the waste toner container may include: a housing 100 having a first reservoir 101 and a second reservoir 102; a light sensor 200 including a light emitting portion 210 and a light receiving portion 220; and a light guide member 300 to connect the light emitting portion 210 with the light receiving portion 220, the light guide member 300 including a first detection portion 301 and a second detection portion 302 each including a pair of optical surfaces that are apart from each other, wherein the first and second detection portions 301 and 302 are provided in the first reservoir 101 and the second reservoir 102, respectively.

The housing 100 may have an inner space, in which foreign substances are accommodated. For example, the housing 100 may include a first housing 110 and the second housing 120 covering the first housing 110. The inner space of the housing 100 may include the first reservoir 101 and the second reservoir 102. The first reservoir 101 and the second reservoir 102 may be divided from each other by a partition wall 160 and the inner cover 130. In an example, the second reservoir 102 may be located in the first reservoir 101. In an example, a waste toner removed from a photoconductor 1001 during an image forming process may be accommodated in the first reservoir 101. A waste toner inlet portion 140 may be connected through the first reservoir 101 and may form an inlet passage of the waste toner. The waste toner removed from the photoconductor 1001 may be introduced into the first reservoir 101 through a waste toner discharge portion 1002. When the waste toner container is mounted in a body of an image forming apparatus, the waste toner discharge portion 1002 may be inserted into the waste toner inlet portion 140. A surplus developer, that is, a waste developer, discharged from a developing device 1000 using an ADR method, may be accommodated in the second reservoir 102. A waste developer inlet portion 150 may be connected through the second reservoir 102 and may form an inlet passage of the waste developer. The waste developer discharged from the developing device 1000 may be introduced into the second reservoir 102 through a waste developer discharge portion 1003. When the waste toner container is mounted in the body of the image forming apparatus, the waste developer discharge portion 1003 may be inserted into the waste developer inlet portion 150. A distribution member 170 to distribute the waste toner in the first reservoir 101 may be provided in the first reservoir 101. The distribution member 170 may include, for example, an auger extending in a longitudinal direction of the first reservoir 101. When the waste toner container is mounted in the body of the image forming apparatus, the distribution member 170 may be driven by being connected to a driving motor provided in the body of the image forming apparatus. The distribution member 170 may transport the waste toner in an axial direction to distribute the waste toner in the first reservoir 101. Although not shown in the drawings, the second reservoir 102 may also include a distribution member.

The light sensor 200 may include the light emitting portion 210 and the light receiving portion 220. The light receiving portion 220 may generate an electrical signal corresponding to the amount of light that is received. A signal processor may be provided in the body of the image forming apparatus. The signal processor may include, for example, an amplifier, a filter, and an AD converter. The electrical signal may be converted into a digital signal by the signal processor. A controller that is not shown may detect a full state of the first reservoir 101 and/or the second reservoir 102, based on the digital signal.

The light guide member 300 may form a light path connecting the light emitting portion 210 with the light receiving portion 220. The light guide member 300 may include the first detection portion 301 and the second detection portion 302. The first detection portion 301 may be located in the first reservoir 101, and the second detection portion 302 may be located in the second reservoir 102. The first detection portion 301 may be located in a position of the first reservoir 101 to detect a full state of the first reservoir 101. For example, the first detection portion 301 may be located in the vicinity of an upper wall 101a of the first reservoir 101. The first detection portion 301 may include a pair of optical surfaces that are apart from each other. Light may be emitted from any one of the pair of optical surfaces and may pass into the first reservoir 101 to be incident on the other optical surface. When there is a waste toner between the pair of optical surfaces of the first detection portion 301, the amount of light that is incident on the other optical surface may be reduced, or light may not be incident on the other optical surface. Likewise, the second detection portion 302 may be located in a position of the second reservoir 102 to detect a full state of the second reservoir 102. For example, the second detection portion 302 may be located in the vicinity of an upper wall 102a of the second reservoir 102. The second detection portion 302 may include a pair of optical surfaces that are apart from each other. Light may be emitted from any one of the pair of optical surfaces and may pass into the second reservoir 102 to be incident on the other optical surface. When there is a waste developer between the pair of optical surfaces, the amount of light that is incident on the other optical surface may be reduced or light may not be incident on the other optical surface.

Figure 3:
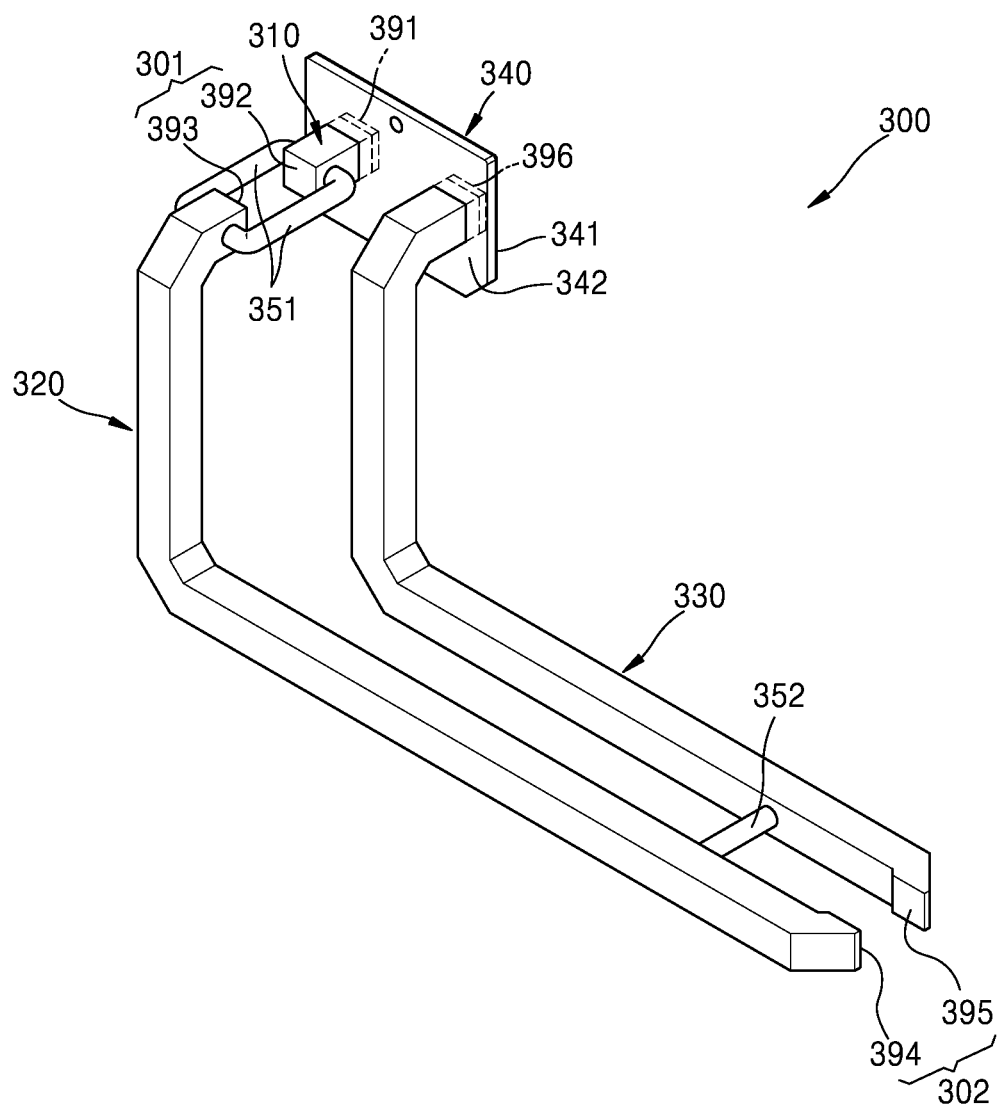
FIG. 3 is a perspective view of an example of a light guide member.

FIG. 3 is a perspective view of an example of the light guide member 300. Referring to FIG. 3, the light guide member 300 may include a facing portion 340, a first light guide 310, a second light guide 320, and a third light guide 330. The facing portion 340, the first light guide 310, the second light guide 320, and the third light guide 330 may include a transmissive material to allow transmission of light. Light may be totally reflected at boundary surfaces between the facing portion 340, the first light guide 310, the second light guide 320, and the third light guide 330, and an external portion thereof, and thus, the light may be propagated in the facing portion 340, the first light guide 310, the second light guide 320, and the third light guide 330.

The facing portion 340 may face the light sensor 200. The facing portion 340 may include a first surface 341 facing the light sensor 200 and a second surface 342 that is opposite to the first surface 341. The first light guide 310 may face any one of the light emitting portion 210 and the light receiving portion 220 and may extend from the second surface 342 of the facing portion 340 to the first reservoir 101. In the present example, the first light guide 310 may face the light emitting portion 210. The first light guide 310 may include a first optical surface 391 and a second optical surface 392. The first optical surface 391 may face the light emitting portion 210.

The second light guide 320 may form the first detection portion 301 between the second light guide 320 and the first light guide 310 in the first reservoir 101. The second light guide 320 may extend from the first reservoir 101 to the second reservoir 102. For example, the second light guide 320 may include a third optical surface 393 facing the second optical surface 392 of the first light guide 310 and a fourth optical surface 394 located in the second reservoir 102. The third optical surface 393 may face the second optical surface 392 in the first reservoir 101. The third optical surface 393 may be apart from the second optical surface 392. The first detection portion 301 may be formed by the second optical surface 392 and the third optical surface 393 facing each other.

The third light guide 330 may face the other of the light emitting portion 201 and the light receiving portion 220, for example, the light receiving portion 220, and may extend from the second surface 342 of the facing portion 340 to the second reservoir 102. The third light guide 330 may form the second detection portion 302 between the third light guide 330 and the second light guide 320 in the second reservoir 102. For example, the third light guide 330 may include a fifth optical surface 395 facing the fourth optical surface 394 of the second light guide 320 and a sixth optical surface 396 connected to the second surface 342 of the facing portion 340 and facing the light receiving portion 220.

The first light guide 310 and the third light guide 330 may be connected to each other via the facing portion 340. Based on this configuration, the facing portion 340, the first light guide 310, and the third light guide 330 may be integrally formed with one another. The facing portion 340 may have a plate shape having a thickness which is relatively much less than a thickness of the first through third light guides 310 through 330. Based on this configuration, the amount of light that is incident onto the first light guide 310 through the first optical surface 391 and that passes through the facing portion 340 to be emitted from the sixth optical surface 396 of the third light guide 330 may be minimized.

As illustrated in FIG. 3 with broken lines, the first optical surface 391 may protrude from the first surface 341 of the facing portion 340. As illustrated in FIG. 3 with broken lines, the sixth optical surface 396 may protrude from the first surface 341 of the facing portion 340. Light irradiated from the light emitting portion 210 and into the light guide member 300 through the first optical surface 391 may be propagated inside the light guide member 300 so as to be emitted through the sixth optical surface 396 to be incident onto the light receiving portion 220. In other words, the light emitted from the light emitting portion 210 may be incident onto the light receiving portion 220 through the first optical surface 391, the first light guide 310, the second optical surface 392, the first reservoir 101, the third optical surface 393, the second light guide 320, the fourth optical surface 394, the second reservoir 102, the fifth optical surface 395, the third light guide 330, and the sixth optical surface 396. In this process, the second optical surface 392 and the third optical surface 393 may form the first detection portion 301 to detect whether or not the first reservoir 101 is full of the waste toner, and the fourth optical surface 394 and the fifth optical surface 395 may form the second detection portion 302 to detect whether or not the second reservoir 102 is full of the waste developer.

Figure 4:
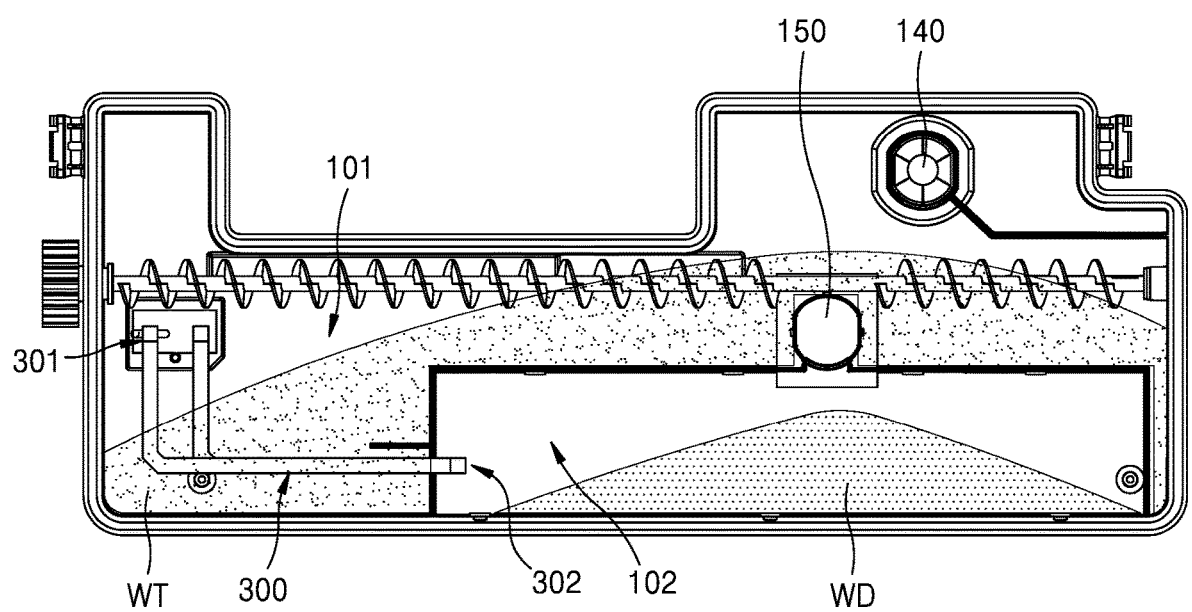
FIG. 4 is a view showing an operation of the example of the waste toner container illustrated in FIGS. 1 through 3, the operation indicating a state in which a first reservoir and a second reservoir are not full.
Figure 5:
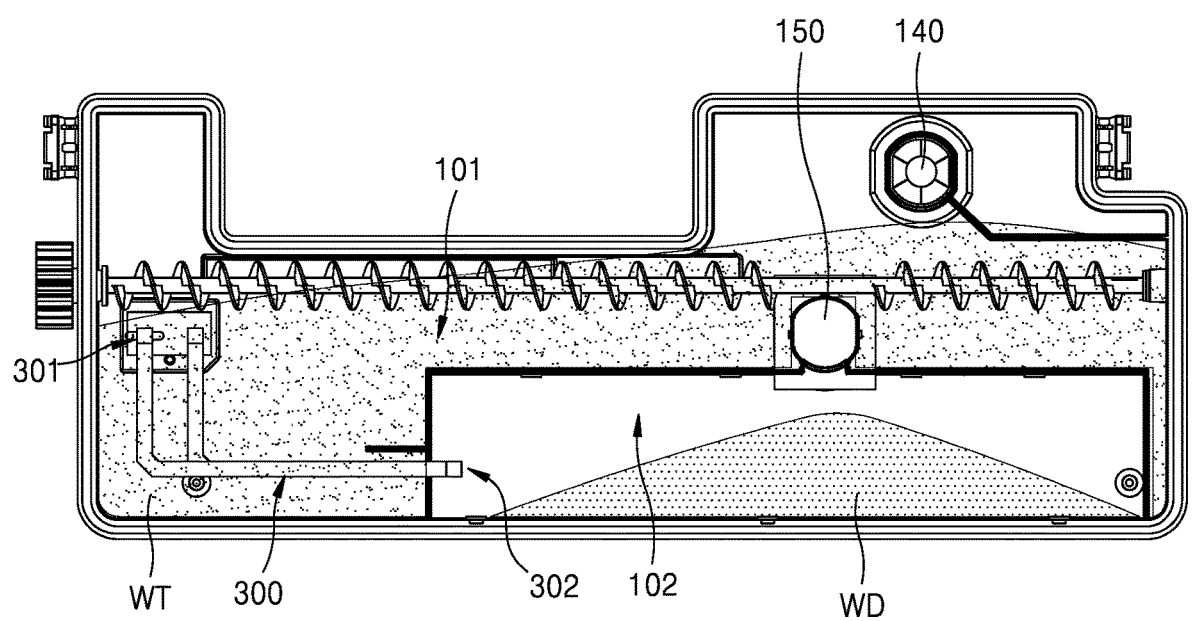
FIG. 5 is a view showing an operation of the example of the waste toner container illustrated in FIGS. 1 through 3, the operation indicating a state in which a first reservoir is full of a waste toner and a second reservoir is not full of a waste developer.
Figure 6:
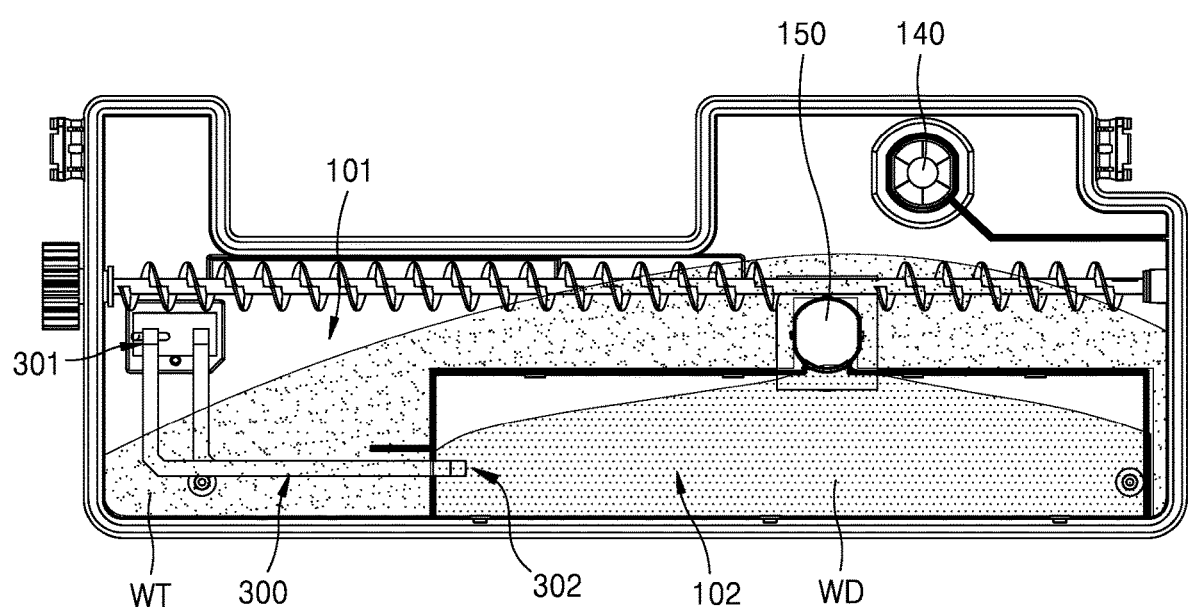
FIG. 6 is a view showing an operation of the example of the waste toner container illustrated in FIGS. 1 through 3, the operation indicating a state in which a first reservoir is not full of a waste toner and a second reservoir is full of a waste developer.

FIG. 4 is a view showing an operation of the example of the waste toner container illustrated in FIGS. 1 through 3, the operation indicating a state in which the first reservoir 101 and the second reservoir 102 are not full. FIG. 5 is a view showing an operation of the example of the waste toner container illustrated in FIGS. 1 through 3, the operation indicating a state in which the first reservoir 101 is full of a waste toner, and the second reservoir 102 is not full of a waste developer. FIG. 6 is a view showing an operation of the example of the waste toner container illustrated in FIGS. 1 through 3, the operation indicating a state in which the first reservoir 101 is not full of a waste toner, and the second reservoir 102 is full of a waste developer. Referring to FIGS. 4 through 6, the operation of the example of the waste toner container is described.

First, referring to FIG. 4, a waste toner WT and a waste developer WD may be accommodated in the first reservoir 101 and the second reservoir 102, respectively. A level of the waste toner WT in the first reservoir 101 may be lower than the first detection portion 301. A level of the waste developer WD in the second reservoir 102 may be lower than the second detection portion 302. Because a light path between the second optical surface 392 and the third optical surface 393 is open (not obstructed by the waste toner WT), light emitted from the second optical surface 392 may be incident onto the third optical surface 393. Also, because a light path between the fourth optical surface 394 and the fifth optical surface 395 is open (not obstructed by the waste developer WD), light emitted from the fourth optical surface 394 may be incident onto the fifth optical surface 395. Thus, light emitted from the light emitting portion 210 may be propagated in the first light guide 310, the second light guide 320, and the third light guide 330 and may be incident onto the light receiving portion 220 through the sixth optical surface 396. The light receiving portion 220 may generate an electrical signal proportional to the amount of the incident light, and a signal processor may convert the electrical signal into a digital value corresponding to the amount of light. A controller of an image forming apparatus that is not shown may, for example, compare a reference light amount value stored in a memory with the digital value. For example, the digital value may be greater than the reference light amount value. In this case, the controller may determine that the first reservoir 101 and the second reservoir 102 are not in a full state.

Next, referring to FIG. 5, a level of the waste toner WT in the first reservoir 101 may be higher than the first detection portion 301. A level of the waste developer WD in the second reservoir 102 may be lower than the second detection portion 302. Because a light path between the second optical surface 392 and the third optical surface 393 is blocked by the waste toner WT, light emitted from the second optical surface 392 may not be incident onto the third optical surface 393, or the amount of light that is incident may be very small. Because a light path between the fourth optical surface 394 and the fifth optical surface 395 is open, light emitted from the fourth optical surface 394 may be incident onto the fifth optical surface 395. Thus, light emitted from the light emitting portion 210 may be blocked between the first light guide 310 and the second light guide 320 and may not be incident onto the light receiving portion 220, or merely a very small amount of light may be incident onto the light receiving portion 220. The light receiving portion 220 may generate an electrical signal proportional to the amount of incident light, and a signal processor may convert the electrical signal into a digital value. A controller of an image forming apparatus that is not shown may, for example, compare a reference light amount value stored in a memory with the digital value. For example, the digital value may be less than the reference light amount value. The controller may determine that the first reservoir 101 or the second reservoir 102 is in a full state.

Next, referring to FIG. 6, a level of the waste toner WT in the first reservoir 101 may be lower than the first detection portion 301. A level of the waste developer WD in the second reservoir 102 may be higher than the second detection portion 302. Because a light path between the second optical surface 392 and the third optical surface 393 is open, light emitted from the second optical surface 392 may be incident onto the third optical surface 393. Because a light path between the fourth optical surface 394 and the fifth optical surface 395 is blocked by the waste developer WD, light emitted from the fourth optical surface 394 may not be incident onto the fifth optical surface 395, or the amount of incident light may be very small. Thus, light emitted from the light emitting portion 210 may be blocked between the second light guide 320 and the third light guide 330 and may not be incident onto the light receiving portion 220, or merely a very small amount of light may be incident onto the light receiving portion 220. The light receiving portion 220 may generate an electrical signal proportional to the amount of incident light, and a signal processor may convert the electrical signal into a digital value. A controller of an image forming apparatus that is not shown may, for example, compare a reference light amount value stored in a memory with the digital value, and may determine that the first reservoir 101 or the second reservoir 102 is in a full state.

When the first reservoir 101 is at a full state but the full state is not detected, the waste toner removed from the photoconductor 1001 may not be introduced to the first reservoir 101. Then, pressure of the waste toner in a waste toner reservoir space of the developing device 1000 may be increased, and thus, the waste toner may be leaked to the outside of the developing device 1000. The waste toner on a surface of the photoconductor 1001 may not be properly removed, and thus, a printed image may be contaminated by the waste toner and the image quality of the printed image may deteriorate. When the second reservoir 102 is at a full state but the full state is not detected, pressure of the developer in the developing device 1000 may be excessively increased. Then, the charging amount of a toner may become insufficient to degrade the image quality, and the toner may be scattered to the outside of the developing device 1000 in a developing process from the developing device 1000 to the photoconductor 1001. Also, the developer may be fixed in the developing device 1000 to damage the developing device 1000. As described above, according to the waste toner container according to the present examples, the light guide member 300 having the two detection portions, that is, the first and second detection portions 301 and 302, may be implemented, and thus, a single light sensor, that is, the light sensor 200, may be used to detect a full state of the first reservoir 101 and the second reservoir 102. When at least one of the first reservoir 101 and the second reservoir 102 is in a full state, the light sensor 200 may detect the full state. Thus, the waste toner container may be replaced by a new container at an appropriate time point, and thus, deterioration of the image quality or the breakdown of the developing device 1000 may be prevented. Also, whether or not the first reservoir 101 and the second reservoir 102 are in a full state may be detected by the single light sensor 200, and thus, the cost of a waste toner container, which is a consumable product, may be reduced, and the burden of a user regarding the consumable product may be alleviated. Also, a first connection portion 351 may function as an enforcement member to stably maintain a distance and a relative location between the second optical surface 392 and the third optical surface 393. Based on this configuration, in a manufacturing process of the light guide member 300 and in a process of assembling the light guide member 300 onto the housing 100, errors with respect to the distance and the relative location between the second optical surface 392 and the third optical surface 393 may be reduced, and thus, whether or not the first reservoir 101 is in a full state may be reliably detected.

Referring to FIG. 3 again, the light guide member 300 may include the first connection portion 351 provides a detour light path around the first detection portion 301 to connect the first light guide 310 with the second light guide 320. The first connection portion 351 may extend from the first light guide 310, may provide a detour light path around the second optical surface 392 and the third optical surface 393, and may be connected to the second light guide 320. Based on this configuration, the first light guide 310 and the second light guide 320 may be integrally formed with each other. Also, the light guide member 300 may be realized, the light guide member 300 including the first light guide 310, the second light guide 320, and the third light guide 330 that are integrally formed with one another via the facing portion 340 and the first connection portion 351.

In order to minimize the amount of light propagated from the first light guide 310 to the second light guide 320 through the first connection portion 351, a cross-sectional area of the first connection portion 351 may be less than a cross-sectional area of each of the first light guide 310 and the second light guide 320. For example, the cross-sectional area of the first connection portion 351 may be equal to or less than a half of each of the cross-sectional area of the first light guide 310 and the second light guide 320. Here, the cross-sectional areas of the first light guide 310 and the second light guide 320 may be cross-sectional areas of the second optical surface 392 and the third optical surface 393, respectively.

Referring to FIG. 3, the light guide member 300 may include a second connection portion 352 provides a detour light path away from the second detection portion 302 to connect the second light guide 320 with the third light guide 330. The second connection portion 352 may extend from the second light guide 320, may provide a detour light path away from the fourth optical surface 394 and the fifth optical surface 395, and may be connected to the third light guide 330. Based on this configuration, the second light guide 320 and the third light guide 330 may be integrally formed with each other. Also, the light guide member 300 may be realized, the light guide member 300 including the first light guide 310, the second light guide 320, and the third light guide 330 that are integrally formed with one another via the facing portion 340, the first connection portion 351, and the second connection portion 352. Also, the second connection portion 352 may function as an enforcement member to stably maintain a distance and a relative location between the fourth optical surface 394 and the fifth optical surface 395. Based on this configuration, in a manufacturing process of the light guide member 300 and in a process of assembling the light guide member 300 onto the housing 100, errors with respect to the distance and the relative location between the fourth optical surface 394 and the fifth optical surface 395 may be reduced, and thus, whether or not the second reservoir 102 is in a full state may be reliably detected.

In order to minimize the amount of light propagated from the second light guide 320 to the third light guide 330 through the second connection portion 352, a cross-sectional area of the second connection portion 352 may be less than a cross-sectional area of each of the second light guide 320 and the third light guide 330. For example, the cross-sectional area of the second connection portion 352 may be equal to or less than a half of each of the cross-sectional area of the second light guide 320 and the third light guide 330. Here, the cross-sectional areas of the second light guide 320 and the third light guide 330 may be cross-sectional areas of the fourth optical surface 394 and the fifth optical surface 395, respectively.

Figure 7:
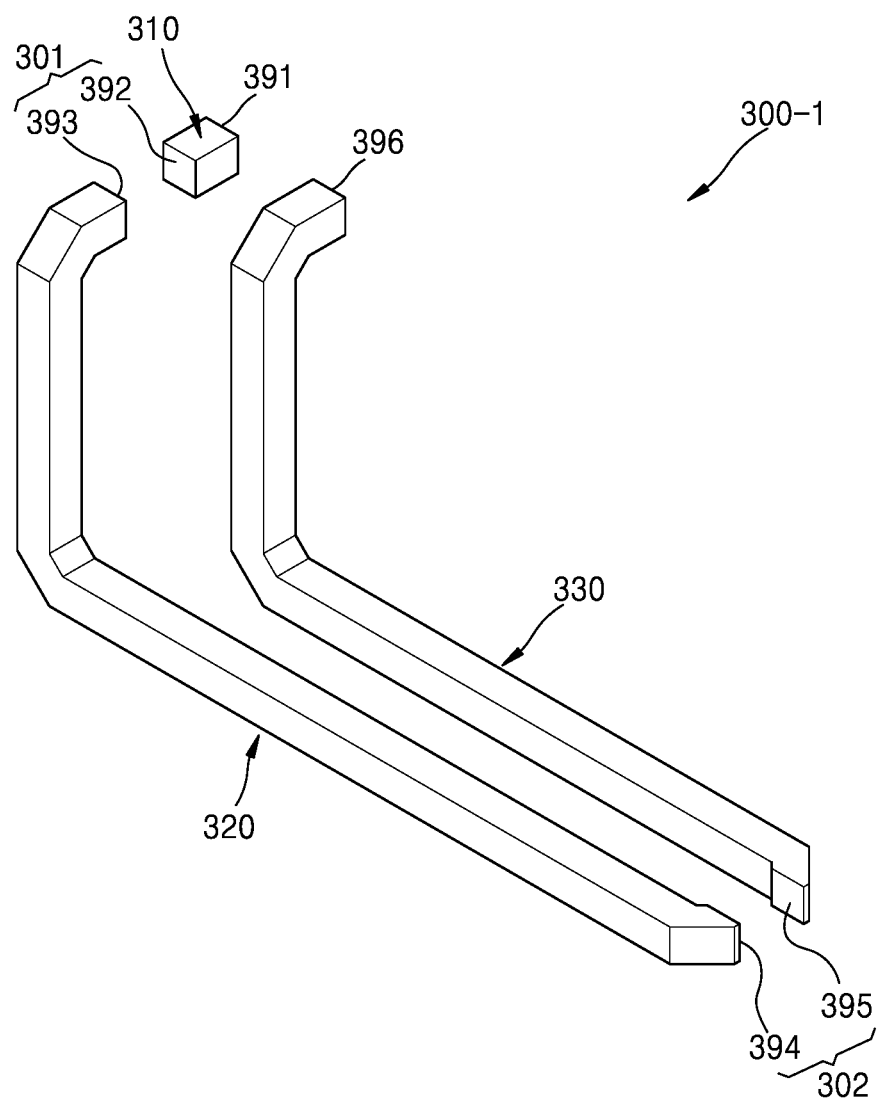
FIGS. 7 through 10 are perspective views of various examples of a light guide member.
Figure 8:
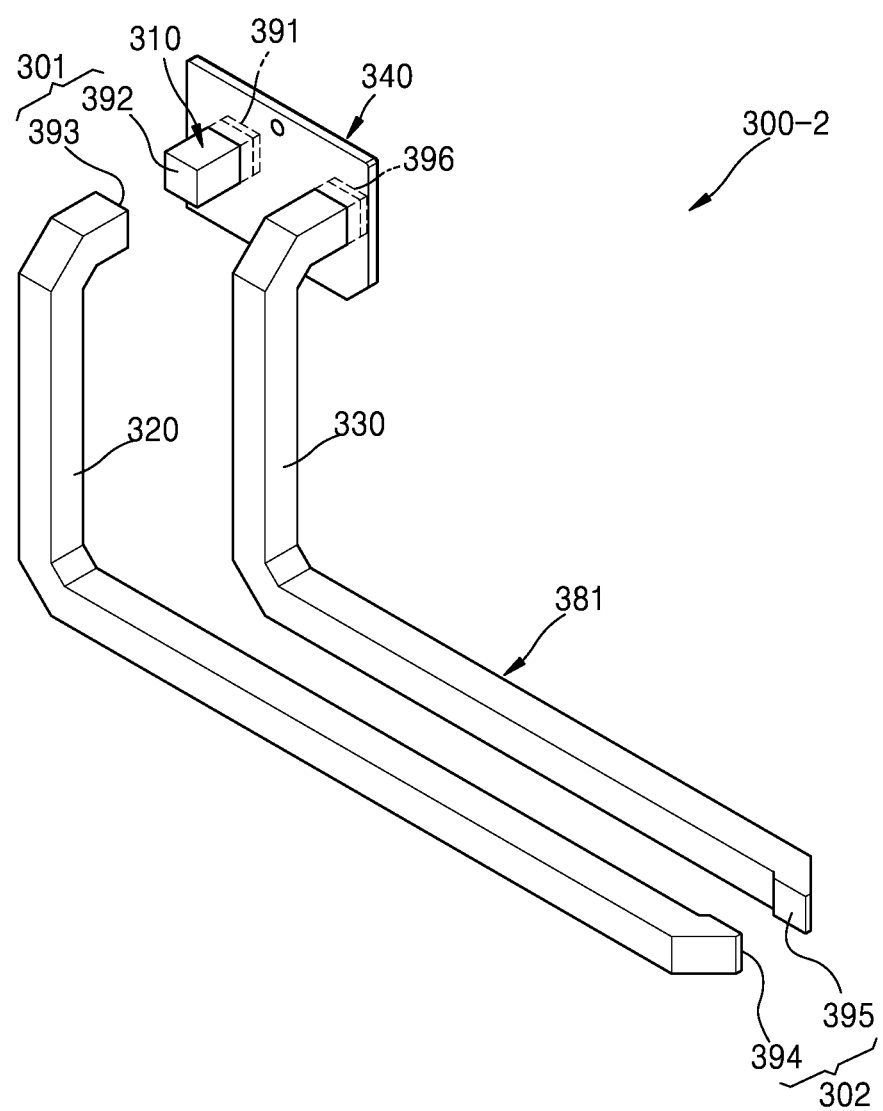
Figure 9:
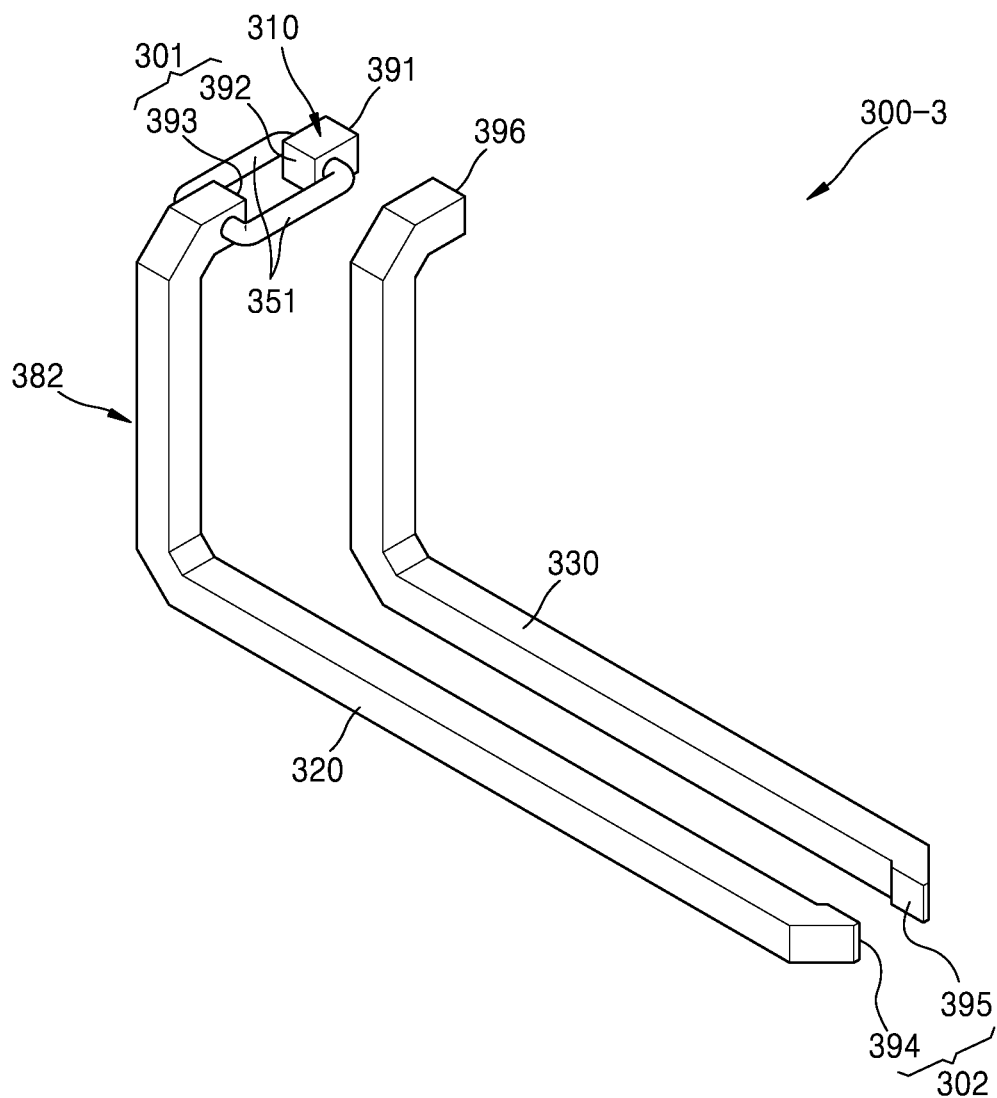
Figure 10:
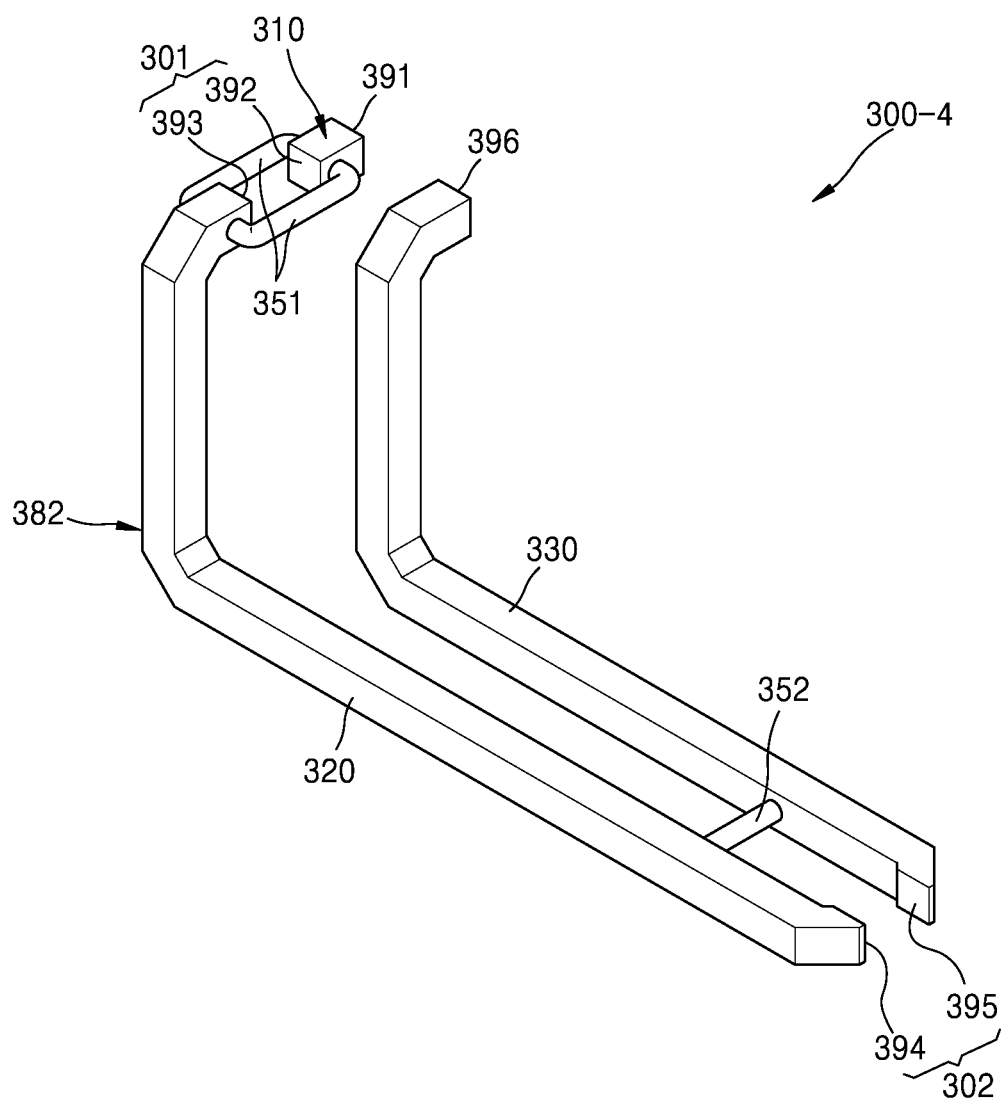

In other examples, a structure of a light guide member may be modified. FIGS. 7 through 10 are perspective views of various examples of light guide members. Referring to FIG. 7, a light guide member 300-1 according to the present example may be different from the light guide member 300 illustrated in FIGS. 1 through 3, in that in the light guide member 300-1, the first light guide 310, the second light guide 320, and the third light guide 330 are formed as separate members. The first light guide 310, the second light guide 320, and the third light guide 330 may be coupled to the housing 100 such that the first light guide 310, the second light guide 320, and the third light guide 330 may form the first detection portion 301 and the second detection portion 302 in the first reservoir 101 and the second reservoir 102, respectively. Referring to FIG. 8, a light guide member 300-2 according to the present example may be different from the light guide member 300 illustrated in FIGS. 1 through 3, in that in the light guide member 300-2, the first light guide 310 and the third light guide 330 are integrally formed with each other via the facing portion 340. A first light guide member 381 in which the facing portion 340, the first light guide 310, and the third light guide 330 are integrally formed with one another may be coupled to the housing 100, and the second light guide 320 may be coupled to the housing 100 to form the first detection portion 301 and the second detection portion 302 in the first reservoir 101 and the second reservoir 102, respectively. Referring to FIG. 9, a light guide member 300-3 according to the present example may be different from the light guide member 300 illustrated in FIGS. 1 through 3, in that in the light guide member 300-3, the first light guide 310 and the second light guide 320 are integrally formed with each other via the first connection portion 351. A second light guide member 382 in which the first light guide 310 and the second light guide 320 are integrally formed with each other may be coupled to the housing 100, and the third light guide 330 may be coupled to the housing 100 to form the second detection portion 302 in the second reservoir 102. Referring to FIG. 10, a light guide member 300-4 according to the present example may be different from the light guide member 300 illustrated in FIGS. 1 through 3 in that in the light guide member 300-4, the first light guide 310, the second light guide 320, and the third light guide 330 are integrally formed with one another through the first connection portion 351 and the second connection portion 352.

Figure 11:
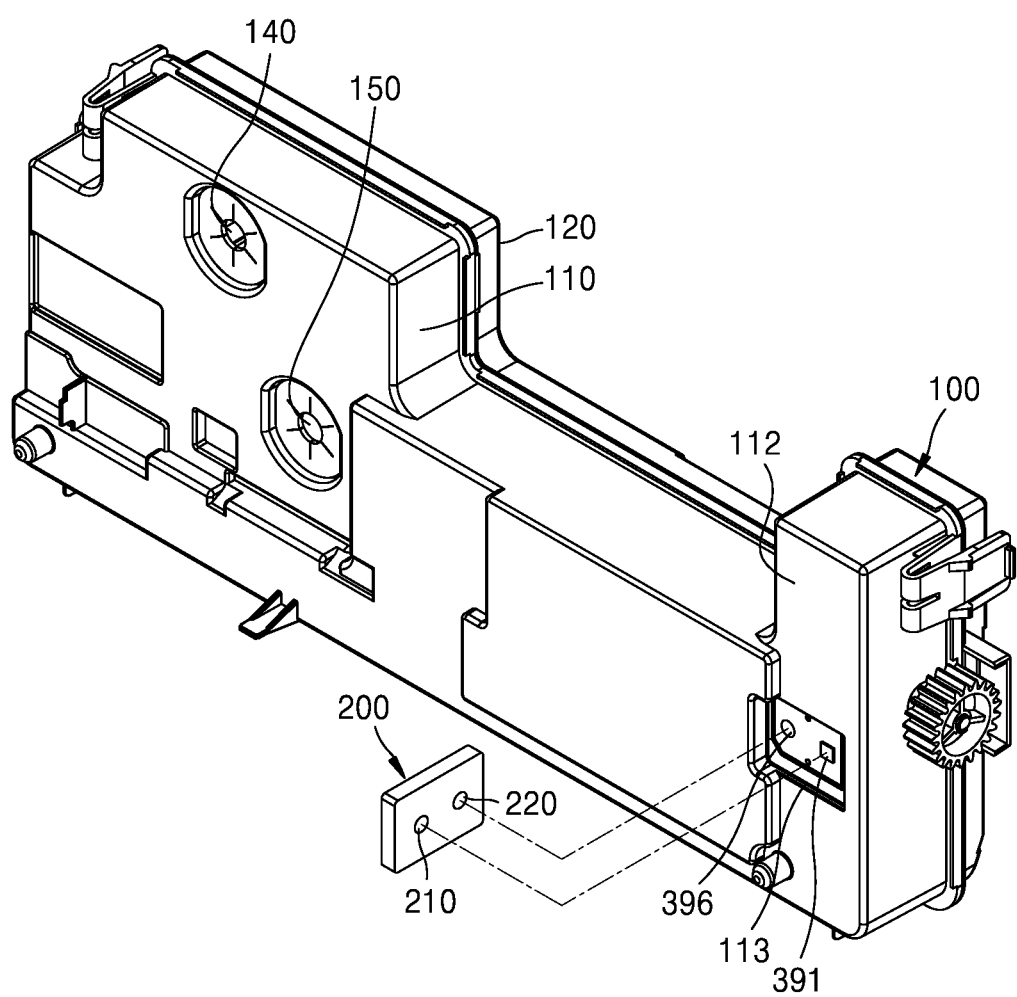
FIG. 11 is a rear perspective view of an example of a waste toner container.

FIG. 11 is a rear perspective view of an example of a waste toner container. Referring to FIG. 11, a waste toner container according to the present example may be different from the examples of the waste toner container illustrated in FIGS. 1 through 10 in that in the waste toner container according to the present example, the light sensor 200 is omitted. Hereinafter, different aspects are mainly described. Referring to FIG. 11, a through-hole 113 may be provided in a rear surface 112 of the housing 100. The first optical surface 391 and the sixth optical surface 396 are exposed through the through-hole 113. When the waste toner container is mounted in a body of an image forming apparatus, the first optical surface 391 may face the light emitting portion 210 of the light sensor 200 provided in the body, and the sixth optical surface 396 may face the light receiving portion 220 of the light sensor 200 provided in the body. Based on this configuration, the cost of the waste toner container may be reduced.

Figure 12:
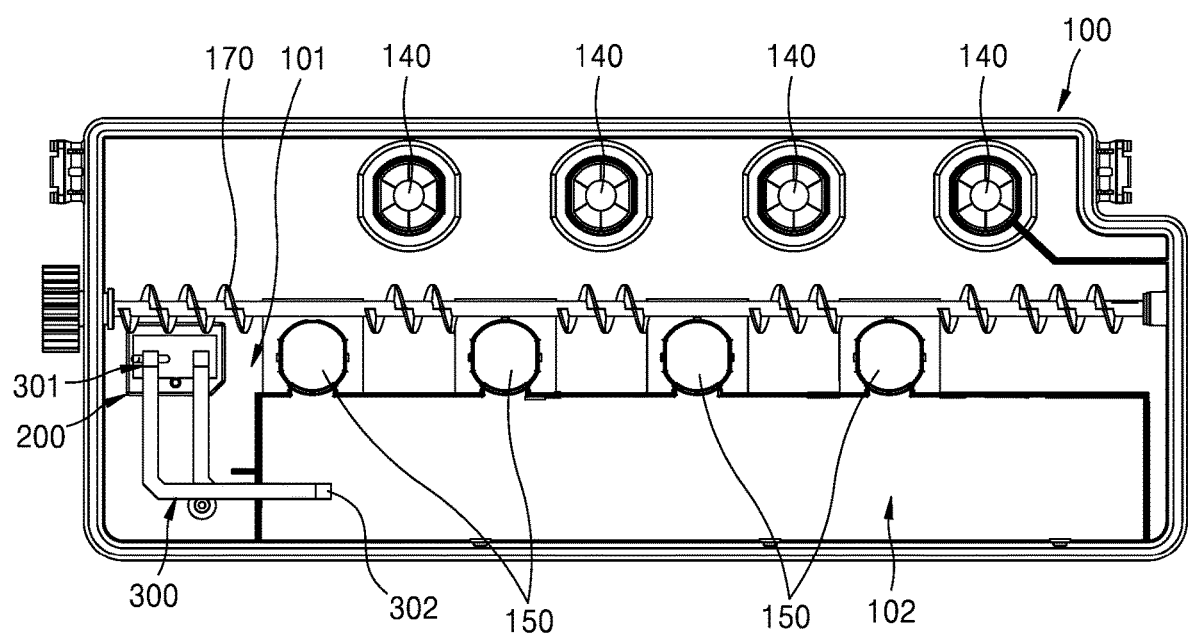
FIG. 12 is a schematic cross-sectional view of an example of a waste toner container.

FIG. 12 is a schematic cross-sectional view of an example of a waste toner container. Referring to FIG. 12, a waste toner container according to the present example may be applied to a color image forming apparatus. The color image forming apparatus may include four photoconductors and four developing devices to form toner images having, for example, a cyan color, a magenta color, a yellow color, and a block color. The color image forming apparatus may include four waste toner discharge portions and four waste developer discharge portions. Thus, the waste toner container may include four waste toner inlet portions 140 corresponding to the four waste toner discharge portions and four waste developer inlet portions 150 corresponding to the four waste developer discharge portions. The four waste toner inlet portions 140 may be connected to the first reservoir 101 and the four waste developer inlet portions 150 may be connected to the second reservoir 102. A structure to detect a full state of the first reservoir 101 and the second reservoir 102 may be the same as described with reference to FIGS. 1 through 11.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:
1. A waste toner container comprising:
a housing having a first reservoir and a second reservoir; and
a light guide member to connect a light emitting portion with a light receiving portion of a light sensor, the light guide member including a first detection portion and a second detection portion each including a pair of optical surfaces that are apart from each other, wherein the first and second detection portions are provided in the first reservoir and the second reservoir, respectively.

2. The waste toner container of claim 1, wherein the light guide member includes:
   a facing portion including a first surface facing the light sensor and a second surface that is opposite to the first surface;
   a first light guide facing one of the light emitting portion and the light receiving portion and extending from the second surface of the facing portion to the first reservoir;
   a second light guide to form, in the first reservoir, the first detection portion between the second light guide and the first light guide, the second light guide extending from the first reservoir to the second reservoir; and
   a third light guide facing the other of the light emitting portion and the light receiving portion and extending from the second surface to the second reservoir to form the second detection portion between the third light guide and the second light guide.

3. The waste toner container of claim 2, wherein the first light guide and the third light guide protrude from the first surface of the facing portion and face the light sensor.

4. The waste toner container of claim 2, wherein the light guide member includes a first connection portion that provides a detour light path around the first detection portion to connect the first light guide with the second light guide, and
   the facing portion, the first light guide, the second light guide, and the third light guide are formed integrally with one another.

5. The waste toner container of claim 4, wherein the light guide member includes a second connection portion that provides a detour light path away from the second detection portion to connect the second light guide with the third light guide.

6. The waste toner container of claim 5, wherein a cross-sectional area of each of the first connection portion and the second connection portion is less than a cross-sectional area of each of the first light guide, the second light guide, and the third light guide.

7. The waste toner container of claim 1, wherein the second reservoir is located in the first reservoir.

8. The waste toner container of claim 1, further comprising:
   a waste toner inlet connected through the first reservoir to form an inlet passage of a waste toner; and
   a waste developer inlet connected through the second reservoir to form an inlet passage of a waste developer.

9. The waste toner container of claim 8, comprising a plurality of waste toner inlets and a plurality of waste developer inlets.

10. A waste toner container comprising:
    a housing having a first reservoir and a second reservoir;
    a first light guide including a first optical surface and a second optical surface, the second optical surface being located in the first reservoir;
    a second light guide having a third optical surface and a fourth optical surface, the third optical surface facing the second optical surface of the first light guide, and the fourth optical surface being located in the second reservoir; and
    a third light guide having a fifth optical surface and a sixth optical surface, the fifth optical surface facing the fourth optical surface of the second light guide.

11. The waste toner container of claim 10, further comprising a light sensor including a light emitting portion to irradiate light to one of the first optical surface of the first light guide and the sixth optical surface of the third light guide, and a light receiving portion to receive light from the other of the first optical surface of the first light guide and the sixth optical surface of the third light guide.

12. The waste toner container of claim 11, further comprising a facing portion to connect the first light guide with the third light guide to make the first optical surface and the sixth optical surface face the light sensor, wherein the first light guide and the third light guide are integrally formed with each other.

13. The waste toner container of claim 11, further comprising a first connection portion extending from the first light guide and providing a detour light path around the second optical surface of the first light guide and the third optical surface of the second light guide, the first connection portion connecting the first light guide to the second light guide,
    wherein the first light guide and the second light guide are integrally formed with each other.

14. The waste toner container of claim 11, further comprising a second connection portion extending from the second light guide and providing a detour light path away from the fourth optical surface of the second light guide and the fifth optical surface of the third light guide, the second connection portion connecting the second light guide to the third light guide,
    wherein the second light guide and the third light guide are integrally formed with each other.

15. The waste toner container of claim 10, wherein the second reservoir is located in the first reservoir.

* * * * *